United States Patent
Heiks

(10) Patent No.: US 7,410,304 B2
(45) Date of Patent: Aug. 12, 2008

(54) OPTICAL FIBER RIGHT ANGLE TRANSITION

(75) Inventor: Noel A. Heiks, Fairlawn, VA (US)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 87 days.

(21) Appl. No.: 10/494,869

(22) PCT Filed: Nov. 8, 2002

(86) PCT No.: PCT/US02/35982

§ 371 (c)(1),
(2), (4) Date: May 7, 2004

(87) PCT Pub. No.: WO03/041129

PCT Pub. Date: May 15, 2003

(65) Prior Publication Data

US 2004/0240794 A1    Dec. 2, 2004

Related U.S. Application Data

(60) Provisional application No. 60/337,007, filed on Nov. 8, 2001.

(51) Int. Cl.
*G02B 6/36* (2006.01)
*G02B 6/42* (2006.01)

(52) U.S. Cl. ............................ 385/85; 385/83

(58) Field of Classification Search .................. 385/38, 385/42–43, 88–89, 92, 83, 85

See application file for complete search history.

(56) References Cited

U.S. PATENT DOCUMENTS

| | | |
|---|---|---|
| 3,864,018 A | 2/1975 | Miller |
| 3,984,789 A | 10/1976 | Luvison et al. |
| 4,120,923 A | 10/1978 | Kloker et al. |
| 4,130,343 A | 12/1978 | Miller et al. |
| 4,150,870 A | 4/1979 | d'Auria |
| 4,165,496 A | 8/1979 | Di Domenico, Jr. et al. |

(Continued)

FOREIGN PATENT DOCUMENTS

| | | |
|---|---|---|
| DE | 392744 A1 | 2/1991 |
| EP | 000476241 A2 | 3/1992 |
| JP | 363085522 A | 4/1988 |
| JP | 02-220012 | 9/1990 |
| JP | 04-308804 | 10/1992 |
| JP | 1999305151 A | 11/1999 |

(Continued)

OTHER PUBLICATIONS

Drogemuller, K., et al., "Current Progess of Advanced High Speed Parallel Optical Links for Computer Clusters and Switching Systems", pp. 1227-1235, 2000 Electronic Components and Technology Conference.

Rosenberg, P., et al., "The PONI-1 Parallel-Optical Link", pp. 763-769, 1999 Electronic Components and Technology Conference.

European Search Report of corresponding European Application Serial No. 02 79 2237, filed Nov. 8, 2002.

*Primary Examiner*—Michelle R. Connelly-Cushwa
*Assistant Examiner*—Jerry Rahll
(74) *Attorney, Agent, or Firm*—Jonathan D. Baskin

(57) ABSTRACT

A fiber optic termination and method for the fabrication thereof are provided. The fiber optic termination (325) is configured to provide coupling of light between the fiber core (326) and an external optical element from a direction other than the direction of the longitudinal axis. In particular, the fiber optic termination permits coupling of light to a fiber at an angle that is substantially perpendicular to the longitudinal axis of the fiber.

15 Claims, 7 Drawing Sheets

U.S. PATENT DOCUMENTS

| | | |
|---|---|---|
| 4,176,908 A | 12/1979 | Wagner |
| 4,210,923 A | 7/1980 | North et al. |
| 4,225,213 A | 9/1980 | McBride, Jr. et al. |
| 4,296,995 A | 10/1981 | Bickel |
| 4,325,604 A | 4/1982 | Witte |
| 4,407,562 A | 10/1983 | Young |
| 4,415,229 A | 11/1983 | McCullough |
| 4,456,330 A | 6/1984 | Bludii |
| 4,498,730 A | 2/1985 | Tanaka et al. |
| 4,639,074 A | 1/1987 | Murphy |
| 4,699,457 A | 10/1987 | Goodman |
| 4,725,114 A | 2/1988 | Murphy |
| 4,756,590 A | 7/1988 | Forrest et al. |
| 4,790,618 A | 12/1988 | Abe |
| 4,818,058 A | 4/1989 | Bonanni |
| 4,836,638 A | 6/1989 | Finzel |
| 4,859,022 A | 8/1989 | Opdahl et al. |
| 4,893,890 A | 1/1990 | Lutes |
| 4,900,118 A | 2/1990 | Yanagawa et al. |
| 4,927,781 A | 5/1990 | Miller |
| 4,931,077 A | 6/1990 | Angenent et al. |
| 4,932,745 A | 6/1990 | Blonder |
| 4,973,127 A | 11/1990 | Cannon, Jr. et al. |
| 4,981,355 A | 1/1991 | Higgins |
| 5,022,733 A | 6/1991 | Angenent et al. |
| 5,044,711 A | 9/1991 | Saito |
| 5,074,682 A | 12/1991 | Uno et al. |
| 5,121,457 A | 6/1992 | Foley et al. |
| 5,123,073 A | 6/1992 | Pimpinella |
| 5,127,084 A | 6/1992 | Takahashi |
| 5,135,590 A | 8/1992 | Basavanhally et al. |
| 5,163,113 A | 11/1992 | Melman |
| 5,177,804 A | 1/1993 | Shimizu et al. |
| 5,179,609 A | 1/1993 | Blonder et al. |
| 5,181,216 A | 1/1993 | Ackerman et al. |
| 5,185,825 A | 2/1993 | Shigematsu et al. |
| 5,185,846 A | 2/1993 | Basavanhally et al. |
| 5,187,758 A | 2/1993 | Ueda et al. |
| 5,241,614 A | 8/1993 | Ecker et al. |
| 5,257,332 A | 10/1993 | Pimpinella |
| 5,281,305 A | 1/1994 | Lee et al. |
| 5,293,438 A | 3/1994 | Konno et al. |
| 5,297,228 A | 3/1994 | Yanagawa et al. |
| 5,325,451 A | 6/1994 | Hartman et al. |
| 5,337,384 A | 8/1994 | Basavanhally et al. |
| 5,342,478 A | 8/1994 | Welbourn |
| 5,345,530 A | 9/1994 | Lebby et al. |
| 5,346,583 A | 9/1994 | Basavanhally |
| 5,357,590 A | 10/1994 | Auracher |
| 5,361,382 A | 11/1994 | Nakamura et al. |
| 5,377,900 A | 1/1995 | Bergmann |
| 5,379,361 A | 1/1995 | Maekawa et al. |
| 5,390,266 A | 2/1995 | Heitmann et al. |
| 5,412,748 A | 5/1995 | Furuyama et al. |
| 5,431,775 A | 7/1995 | Prince |
| 5,440,655 A | 8/1995 | Kaplow et al. |
| 5,446,815 A | 8/1995 | Ota et al. |
| 5,456,797 A | 10/1995 | Weber et al. |
| 5,461,683 A | 10/1995 | Harman |
| 5,465,860 A | 11/1995 | Fujimoto et al. |
| 5,483,608 A | 1/1996 | Yokomachi et al. |
| 5,499,309 A | 3/1996 | Kozuka et al. |
| 5,500,910 A | 3/1996 | Boudreau et al. |
| 5,500,911 A | 3/1996 | Roff |
| 5,540,346 A | 7/1996 | Fujimoto et al. |
| 5,555,333 A | 9/1996 | Kato |
| 5,566,262 A | 10/1996 | Yamane et al. |
| 5,568,585 A | 10/1996 | Kramer |
| 5,596,662 A | 1/1997 | Boscher |
| 5,602,951 A | 2/1997 | Shiota et al. |
| 5,611,006 A | 3/1997 | Tabuchi |
| 5,613,024 A | 3/1997 | Shahid |
| 5,623,564 A | 4/1997 | Presby |
| 5,671,315 A | 9/1997 | Tabuchi et al. |
| 5,689,599 A | 11/1997 | Shahid |
| 5,699,463 A | 12/1997 | Yang et al. |
| 5,703,973 A | 12/1997 | Mettler et al. |
| 5,706,378 A | 1/1998 | Suzuki et al. |
| 5,727,009 A | 3/1998 | Tajiri et al. |
| 5,732,167 A | 3/1998 | Ishiko et al. |
| 5,757,991 A | 5/1998 | Harman |
| 5,778,123 A | 7/1998 | Hagan et al. |
| 5,785,825 A | 7/1998 | Hwang et al. |
| 5,815,621 A | 9/1998 | Sakai et al. |
| 5,828,800 A | 10/1998 | Henry et al. |
| 5,853,626 A | 12/1998 | Kato et al. |
| 5,901,262 A | 5/1999 | Kobayashi et al. |
| 5,909,524 A | 6/1999 | Tabuchi |
| 5,920,665 A | 7/1999 | Presby |
| 5,940,557 A | 8/1999 | Harker |
| 5,953,477 A | 9/1999 | Wach et al. |
| 6,010,251 A | 1/2000 | Koyanagi et al. |
| 6,012,852 A | 1/2000 | Kadar-Kallen et al. |
| 6,023,542 A | 2/2000 | Pan et al. |
| 6,045,270 A | 4/2000 | Weiss et al. |
| 6,056,696 A | 5/2000 | Kallman |
| 6,064,781 A | 5/2000 | Seibold et al. |
| 6,085,007 A | 7/2000 | Jiang et al. |
| 6,086,704 A | 7/2000 | Kanai et al. |
| 6,101,299 A | 8/2000 | Laor |
| 6,118,917 A | 9/2000 | Lee et al. |
| 6,160,936 A | 12/2000 | You et al. |
| 6,168,319 B1 | 1/2001 | Francis |
| 6,197,656 B1 | 3/2001 | Adkisson et al. |
| 6,205,274 B1 | 3/2001 | Zhou |
| 6,234,687 B1 | 5/2001 | Hall et al. |
| 6,246,812 B1 | 6/2001 | Liu et al. |
| 6,250,820 B1 | 6/2001 | Melchior et al. |
| 6,278,812 B1 | 8/2001 | Lin et al. |
| 6,315,464 B1 | 11/2001 | Plickert et al. |
| 6,320,997 B1 | 11/2001 | Dautartas et al. |
| 6,328,479 B1 | 12/2001 | Schofield et al. |
| 6,393,174 B1 | 5/2002 | Karaguleff et al. |
| 6,393,175 B1 | 5/2002 | Jurbergs et al. |
| 6,477,303 B1 | 11/2002 | Witherspoon |
| 6,483,961 B1 | 11/2002 | Helkey et al. |
| 6,519,382 B1 | 2/2003 | Jurbergs et al. |
| 6,529,650 B1 | 3/2003 | Tsuru |
| 6,625,356 B2 | 9/2003 | Ticknor et al. |
| 6,848,839 B2 * | 2/2005 | Steinberg ............... 385/88 |
| 6,869,229 B2 * | 3/2005 | Reedy et al. ............ 385/88 |
| 2001/0041026 A1 | 11/2001 | Steinberg et al. |
| 2001/0041029 A1 | 11/2001 | Steinberg et al. |
| 2001/0048785 A1 | 12/2001 | Steinberg |
| 2002/0025104 A1 | 2/2002 | Steinberg et al. |
| 2002/0025107 A1 | 2/2002 | Heiks et al. |
| 2002/0028037 A1 | 3/2002 | Steinberg et al. |
| 2002/0146194 A1 | 10/2002 | Sherrer et al. |
| 2002/0181854 A1 | 12/2002 | Steinberg et al. |
| 2003/0007740 A1 | 1/2003 | Sherrer |
| 2003/0010904 A1 * | 1/2003 | Luo ............... 250/227.11 |
| 2003/0108272 A1 | 6/2003 | Sherrer et al. |
| 2003/0138210 A1 | 7/2003 | Steinberg et al. |

FOREIGN PATENT DOCUMENTS

| | | |
|---|---|---|
| WO | 03/001265 A1 | 1/2003 |
| WO | 03/041129 A3 | 5/2003 |

* cited by examiner

OPTICAL FIBER RIGHT ANGLE TRANSITION

RELATED APPLICATIONS

This application is a National Stage of International Application No. PCT/US02/35982, filed Nov. 8, 2002, which claims the benefit of priority of U.S. Provisional Application 60/337,007, filed on Nov. 8, 2001, the entire contents of which application(s) are incorporated herein by reference.

FIELD OF THE INVENTION

The present invention relates generally to a fiber optic termination and more particularly to a fiber optic termination that permits optical coupling to the fiber core through the side of the fiber.

BACKGROUND OF THE INVENTION

The increasing demand for high-speed voice and data communications has led to an increased reliance on optical communications, particularly optical fiber communications. The use of optical signals as a vehicle to carry channeled information at high speeds is preferred in many instances to carrying channeled information at other electromagnetic wavelengths/frequencies in media such as microwave transmission lines, co-axial cable lines and twisted pair transmission lines. Advantages of optical media are, among others, high-channel capacity (bandwidth), greater immunity to electromagnetic interference, and lower propagation loss. In fact, it is common for high-speed optical communication systems to have signal rates in the range of approximately several Giga bits per second (Gbit/sec) to approximately several tens of Gbit/sec.

One way of carrying information in an optical communication system, for example an optical network, is via an array of optical fibers. Ultimately, the optical fibers need to be terminated in a manner that permits connection of the fibers to other optical components such as optical sources or receivers. Typically, the optical components to which connection is made are located on rack-mounted boards. As rack space in fiber optic networking equipment becomes denser, board-to-board spacing in the racks becomes smaller, and connectivity to the closely spaced boards becomes increasingly difficult. No longer can connectors be placed facing the board surface so that the optical axis of the fiber is perpendicular to the board surface, because the fiber must be bent with too tight of a bend radius in order to fit in between closely spaced boards. The tight bend radius can be avoided by making connections at the edge of the board. However, edge connectivity can be limiting in several ways. Connecting to the edges of the boards not only limits the number of optical channels possible, but also forces the connectivity in an opposite direction most natural to the majority of the preferred datacom light sources and receivers, e.g., vertical-cavity surface-emitting laser (VCSEL) or PIN photodiode array. These preferred sources and receivers are surface plane devices, which are more prevalently used in networking applications today than older edge-emitting technologies. The surface plane devices need connectivity that leverages their vertical light input/output orientation. The vertical orientation introduces problems with connectivity, as explained above, because top-facing connectivity is not possible in racks where the board-to-board density is great. While additional components may be introduced to effect bending of the light from the vertical to horizontal direction, adding even one light bending component increases assembly complexity due to the requirement of optically aligning two interfaces instead of one. Moreover, the addition of a light bending component also increases yield loss and cost.

Accordingly, there exists a need for a relatively simple, inexpensive, fiber termination that leverages the electrical connection benefits of surface plane devices while not introducing extra components into the on-board package.

SUMMARY OF THE INVENTION

In response to the above needs, the present invention provides a fiber optic termination for optically connecting an optical fiber to an optical component, comprising: a fiber holding member for terminating an end of an optical fiber to provide a fiber optic connector; and at least one optical fiber having a distal end, a proximal end and a core, the distal end disposed externally to the fiber holding member and the proximal end retained in the fiber holding member, the proximal end of the fiber having a light reflecting surface disposed at an angle relative to the longitudinal axis of the fiber to deflect light from the fiber core through the side of the fiber. The light reflecting surface may be conveniently oriented at an angle relative to the longitudinal axis of the fiber, to provide total internal reflection of light incident on the reflecting surface from along the direction of the longitudinal axis of the fiber. The fiber optic termination may also comprise a transmission surface positioned to receive light deflected from the light reflecting surface. In particular, either one or both of the light reflecting surface and transmission surface may include a planar sidewall section of the fiber core. In addition, the fiber optic termination may include a registration feature, such as a detent, for positioning the proximal end of the fiber in registration with a selected optical component.

The present invention also provides a method for fabricating a fiber optic termination, comprising the steps of: providing a fiber holding member having a registration feature disposed at a front face of the fiber holding member and having a recessed area at the front face for receiving an optical fiber; securing the terminal end of an optical fiber in the recessed area of the fiber holding member; attaching the fiber holding member to a jig by registering the registration feature of the fiber holding member to a registration element of the jig and securing the front face of the fiber holding member to a mating surface of the jig; and polishing the secured terminal end of the fiber at a selected angle relative to the longitudinal axis of the fiber to provide a light reflecting surface oriented to deflect light from the fiber core out through the side of the fiber. The polishing step may include the step of polishing the terminal end of the fiber at a an angle that provides for total internal reflection of light at the reflecting surface. The method may also include the step of polishing the secured terminal end of the fiber at a selected angle relative to the longitudinal axis of the fiber to provide a transmission surface at the proximal end of the fiber that is oriented to receive light deflected from the light reflecting surface.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 1:
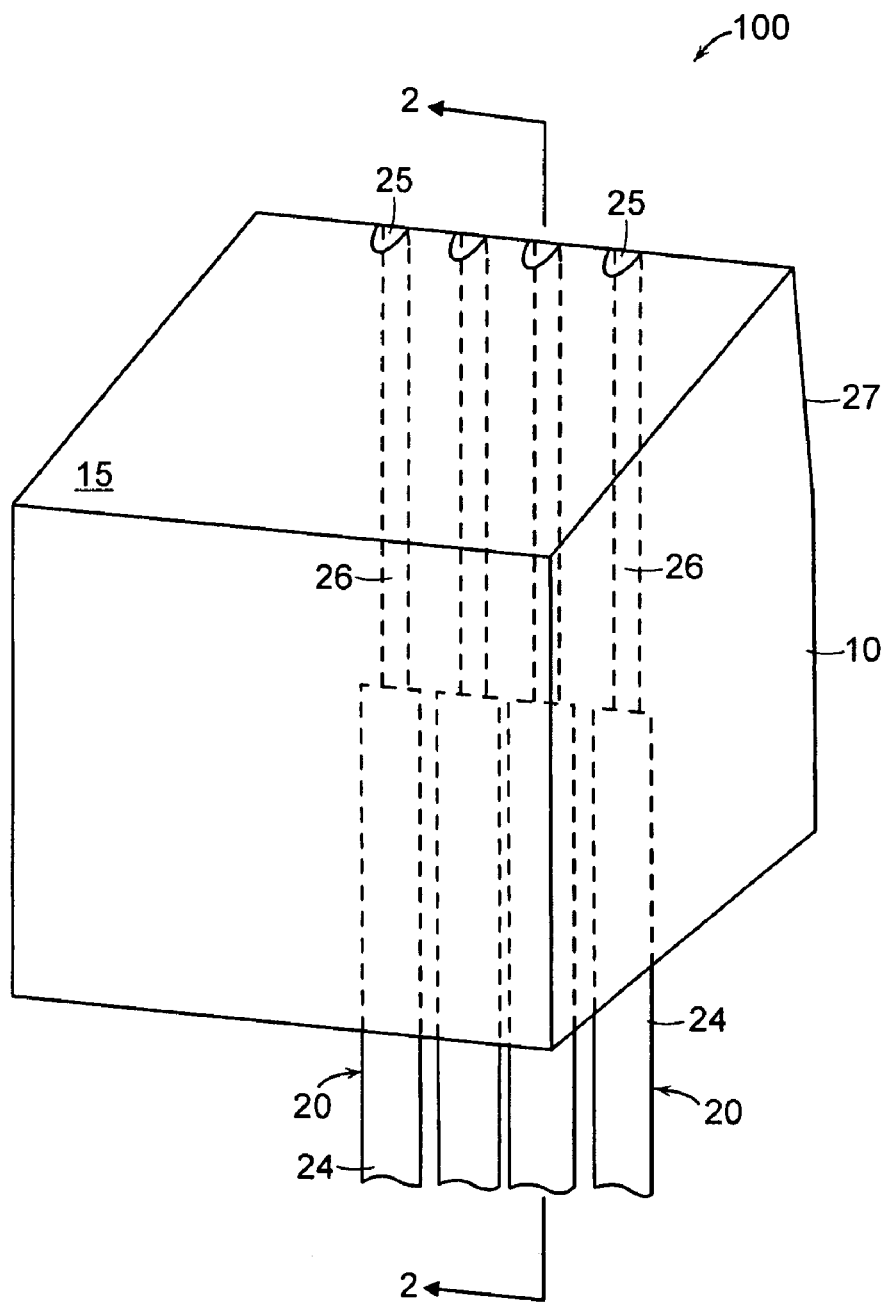
FIG. 1 schematically illustrates a perspective view of a fiber optic termination in accordance with the present invention.
Figure 2:
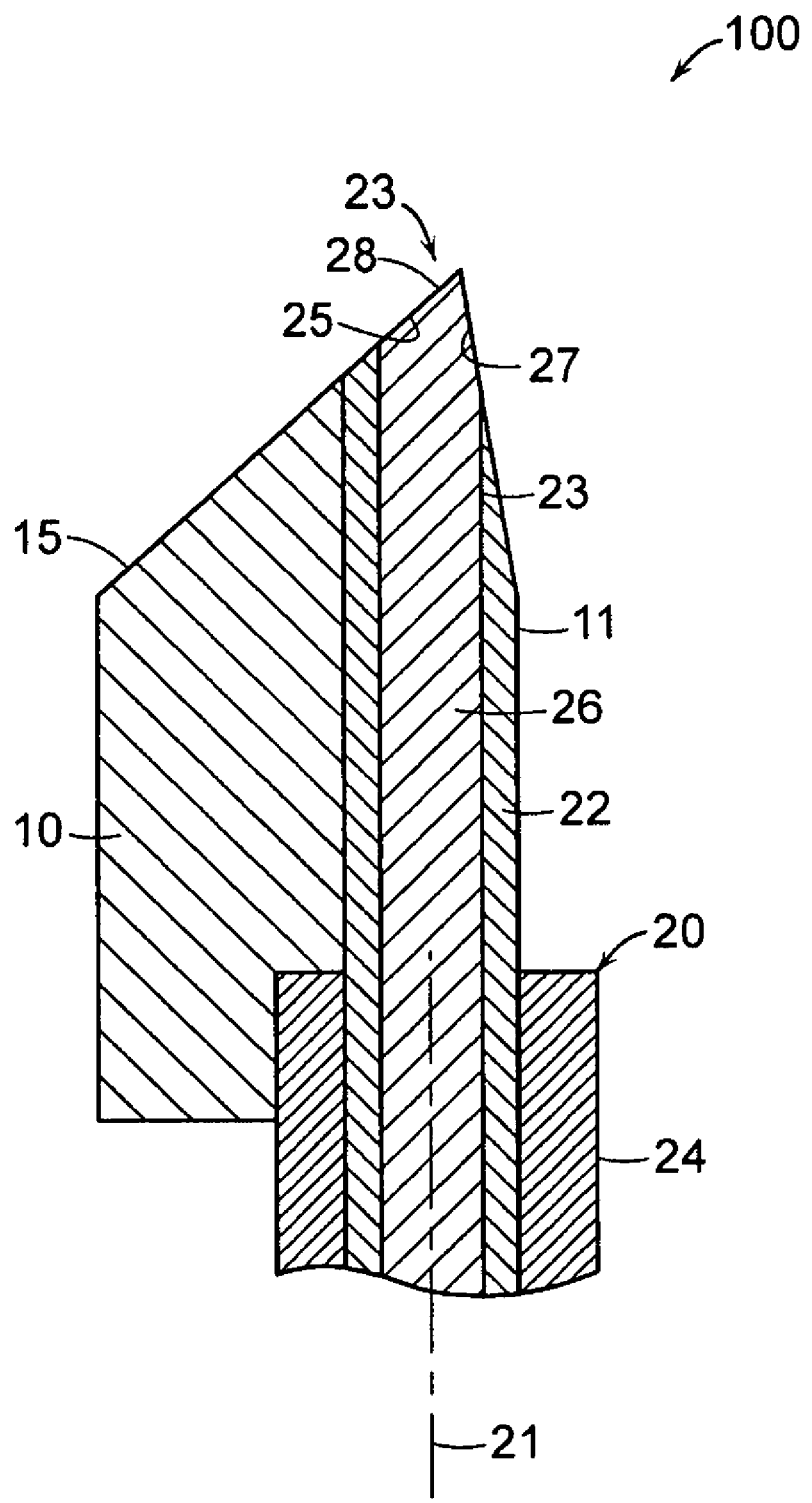
FIG. 2 schematically illustrates a side cross-sectional view of the fiber optic termination of FIG. 1 taken along the sectioning line 2-2.
Figure 3:
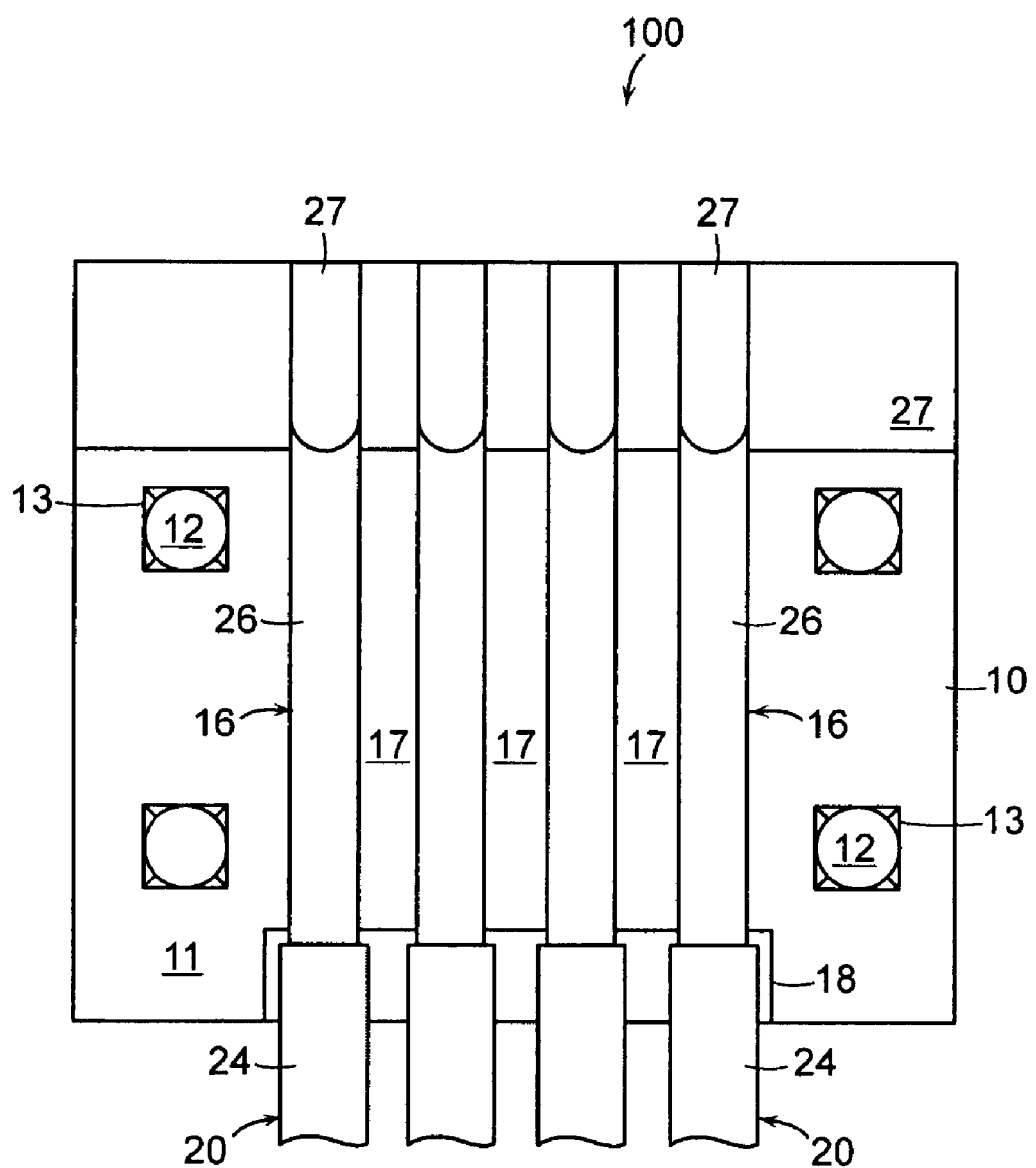
FIG. 3 schematically illustrates a front face view of the fiber optic termination of FIG. 1.

Referring now to the figures, wherein like elements are numbered alike throughout, and in particular to FIGS. 1-3, a fiber optic termination in accordance with the present invention, generally designated 100, is illustrated. The fiber optic termination 100 is configured to provide coupling of light between the fiber core 26 and an external optical element from a direction other than the direction of the longitudinal axis 21. As used herein, the term "light" includes electromagnetic radiation of any wavelength that can propagate within the fiber core 26, including those wavelengths outside of the visible spectrum. The fiber optic termination 100 includes a reflecting surface 25 of the fiber core 26 that is inclined relative to the longitudinal axis 21 of the fiber 20. The angle of inclination of the reflecting surface 25 may be conveniently selected so that light incident on the reflecting surface 25 is deflected permitting light to enter or exit the fiber 20 at an angle substantially perpendicular to the longitudinal axis 21 of the fiber 20. Hence, the fiber optic termination 100 provides an end connector for an optical fiber 20 that permits coupling of light to the fiber 20 at an angle that is substantially perpendicular to the longitudinal axis 21 of the fiber 20.

Referring now to FIGS. 1-3 in greater detail, the fiber optic termination 100 includes a fiber holding member 10 that is configured to receive a terminal end 23 of one or more optical fibers 20. The optical fibers 20, as illustrated herein, have a central optical core 26 surrounded by a cladding 22 which is covered by a jacket 24. By way of example, the optical fiber 20 may be a single mode fiber having an 8 micron diameter core 26, a 125 micron diameter cladding 22, and a 250 micron diameter jacket 24.

The holding member 10 includes a front face 11 having one or more fiber grooves 16 and an optional fiber pocket 18 for receiving small-width segments of the optical fibers 20 and adjoining relatively larger-width segments of the optical fibers 20, respectively. The small-width segments of the optical fibers 20 may be un-jacketed segments of the optical fibers 20 that include the cladding 22 and the core 26. The larger-width segments of the optical fibers 20 may include the jacket 24 of the fibers 20. The optical fibers 20 may be provided either as single fiber strands or as a fiber optic ribbon, in which case the pocket 18 may be sized to receive the ribbon.

The fiber grooves 16 may be dimensioned to enable the un-jacketed segments of the optical fibers 20 to be placed in the fiber grooves 16 so that the un-jacketed segments lie below the plane of the front face 11 of the fiber holding member 10. Moreover, the shape of the fiber grooves 16 may be selected to provide two-point contact between the cladding 22 and the fiber grooves 16. The two-point contact between the fiber grooves 16 and the un-jacketed fiber segments facilitates precise location of the fibers 20 within the fiber grooves 16, which creates improved registration among the fibers 20 in the fiber grooves 16. For example, the grooves may have a V-shaped cross section with sidewalls that are inclined with respect to the plane of the front face 11 to provide two-point contact. Alternatively, the fiber grooves 16 may have other shapes suitable for retaining the un-jacketed segments. Such shapes may include, for example, a U-shaped cross section. The fibers 20 may be secured in the grooves 16 by a suitable adhesive, such as an epoxy, or by solder which may secure the fibers 20 if the fibers 20 have been metalized.

The fiber grooves 16 may be spaced apart at a selected distance which may be as close together as permitted by the fabrication method in order to maximize the fiber packing density linearly across the width of the fiber optic termination 100. Alternatively, as shown in FIG. 3, the fiber grooves 16 may be spaced apart a predetermined distance so that flat regions 17 of the front face 11 are formed intermediate the fiber grooves 16 to provide room for the fiber jacket 24 within the pocket 18.

The fiber holding member 10 may be configured so that the front face 11 can be disposed on or over an optical element, such as a VCSEL or PIN-photodiode array, so that the fiber 20 may be optically coupled to the optical element. In this regard, the front face 11 may include one or more registration features 12 for registering the fiber holding member 10 to a selected optical element. The registration features 12 are provided at selected locations relative to the terminal end 23 of the fiber 20, so that the fiber holding member 10 may conveniently function as a connector that registers the terminal end 23 of the fiber 20 to the selected optical element. The registration features 12 may take the form of a detent or pyramidal pit 13 having registration elements 14, such as a ball or rod, disposed therein, as illustrated in FIG. 3. Alternatively, the registration feature 12 may include a through-hole that extends through thickness of the fiber holding member 10. Further, the registration features 12 may take the form of a protrusion that extends outwardly from the front face 11 of the fiber holding member 10. For example, the protrusions may take the form of a pin. The fiber optic termination 100 may also include structures for attaching the fiber optic termination 100 to a selected optical component. The attachment structure may include a magnet disposed at the front face 11 of the fiber optic termination 100 or a clip for mechanically engaging a complementary mating structure on the selected component. In addition, the attachment structure may include a spring for providing a biasing force that directs the front face 11 of the fiber optic termination 100 towards the selected optical component.

The fiber holding member 10 may be formed of suitable materials having sufficient structural strength and in which features having the above described dimensions can be formed. For example, one particularly suited material is an anisotropic crystalline material, such as single crystal silicon, which may be etched by isotropic or anisotropic processes to form the fiber grooves 16 and pits 13. In particular, fiber grooves 16 having a V-shaped cross section may be formed by etching of <100>-oriented silicon through a mask with a solution of potassium hydroxide. Alternatively, <110>-oriented silicon may be etched though a mask to create features having sidewalls that are perpendicular to the front face 11 of the fiber holding member 10. In addition to etching processes, other milling processes, such as deep reactive ion etching (DRIE), molding from a master, casting, stamping, electroforming, or combinations of these, for example, may be used. Other suitable materials for the fiber holding member 10 include, for example, ceramic, metal, glass, glass filled polymer, and combinations thereof.

To provide for optical coupling to the fiber 20 along a direction substantially perpendicular to the longitudinal axis 21 of the fiber 20, one or more angled surfaces 25, 27 are provided at the terminal end of the fiber 23. Perpendicular optical coupling may refer to the ejection of light from the core 26 to a direction substantially perpendicular to the longitudinal axis 21 of the fiber 20. Perpendicular optical coupling may also refer to injection of light to the core 26 from a direction substantially perpendicular to the longitudinal axis 21 of the fiber 20. For purposes of illustration, the following descriptions relate to the situation where light is traveling along the longitudinal axis 21 towards the terminal end 23 of the fiber 20 and is being ejected from the fiber 20. However, one skilled in the art will readily appreciate that the structures so described are equally well suited for injecting light into the fiber core 26 from a direction substantially perpendicular to the longitudinal axis 21 of the fiber 20.

Figure 7:
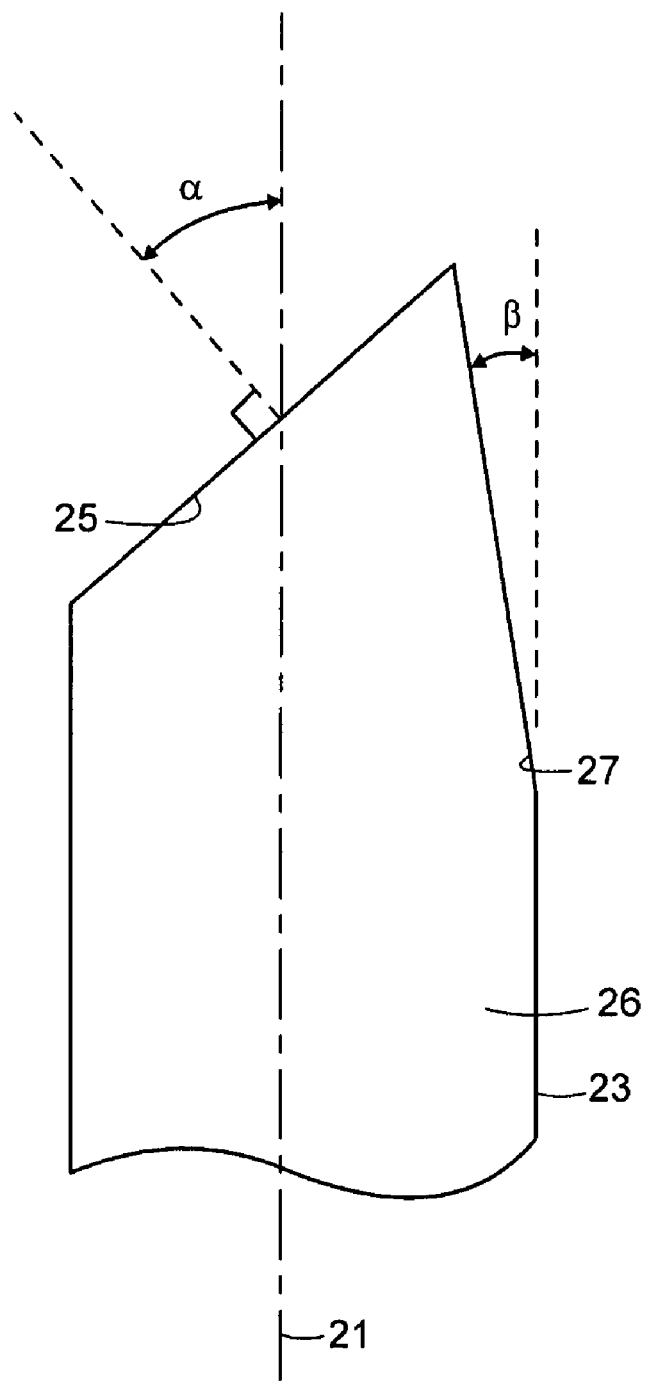
FIG. 7 schematically illustrates an enlarged view of the core at the terminal end of the optical fiber of FIG. 2.

Referring now to FIG. 2, the terminal end 23 of the fiber 20 includes an angled reflecting surface 25 that extends across at least a portion of the fiber core 26. The angled reflecting surface 25 may be oriented so that light ejected from the fiber 20 substantially perpendicular to the front face 11 of the fiber optic termination 100. The reflecting surface 25 is disposed at an inclination angle, α>0, relative to the longitudinal axis 21 of the fiber 20, as shown in FIG. 7. The inclination angle, α, is the angle between the longitudinal axis 21 of the fiber 20 and the normal to the reflecting surface 25. The value of the inclination angle, α, may be selected so that light incident on the reflecting surface 25 is reflected into a selected direction that is substantially perpendicular to the longitudinal axis 21 of the fiber 20. In particular, the reflecting surface 25 may be provided as a planar surface disposed at an inclination angle, α, that provides total internal reflection of light at the reflecting surface 25. Total internal reflection occurs when the inclination angle, α, is selected such that $\sin(\alpha) \geq n2/n1$, where n1 is the refractive index of the core 26 and n2 is the refractive index external to the fiber core 26 adjacent the reflecting surface 25. Typically, the medium external to the fiber core 26 at the reflecting surface 25 is air, which has a refractive index, n2, of 1. Thus, total internal reflection occurs when $\sin(\alpha) \geq 1/n1$. For example, for a fiber core 26 having a refractive index of 1.45, total internal reflection occurs for values of $\alpha \geq 45°$.

An optional coating 28 may be provided on the reflecting surface 25 to prevent foreign matter, such as dust, from contacting the reflecting surface 25 and deflecting light out of the fiber 20 through the reflecting surface 25. The coating 28 should have a refractive index lower than that of the fiber core 26 so that total internal reflection is possible at the reflecting surface 25. The coating thickness should be sufficiently large relative to the penetration depth of the evanescent wave within the coating 28, so that the presence of foreign matter on the coating 28 does not frustrate the total internal reflection at the reflecting surface 25 beyond an acceptable amount. If a coating 28 is applied to the reflecting surface 25, the inclination angle, α, must be selected with regard to the presence of the coating 28, which will likely have an index of refraction, n2, greater than 1. For example, if a coating 28 is applied having a refractive index greater than 1, the inclination angle required for total internal reflection will have a larger value than that required for the case where n2=1. As an additional option for protecting the reflecting surface 25, a housing may be provided about the reflective surface 25 to prevent the introduction of foreign matter on the reflective surface 25. Such a housing may be hermetically sealed to the fiber optic termination 100 and may include the aforementioned attachment structures.

Alternatively or additionally, the coating 28 may provide or enhance the reflecting properties of the reflecting surface 25. For example, the coating 28 may be a metal or a multilayer thin film that provides a mirror on the reflective surface 25. In such a case, where the reflective properties of the reflecting surface 25 are provided substantially or entirely by the coating 28, the inclination angle need not be selected with regard to the angle required for total internal reflection.

Figure 4:
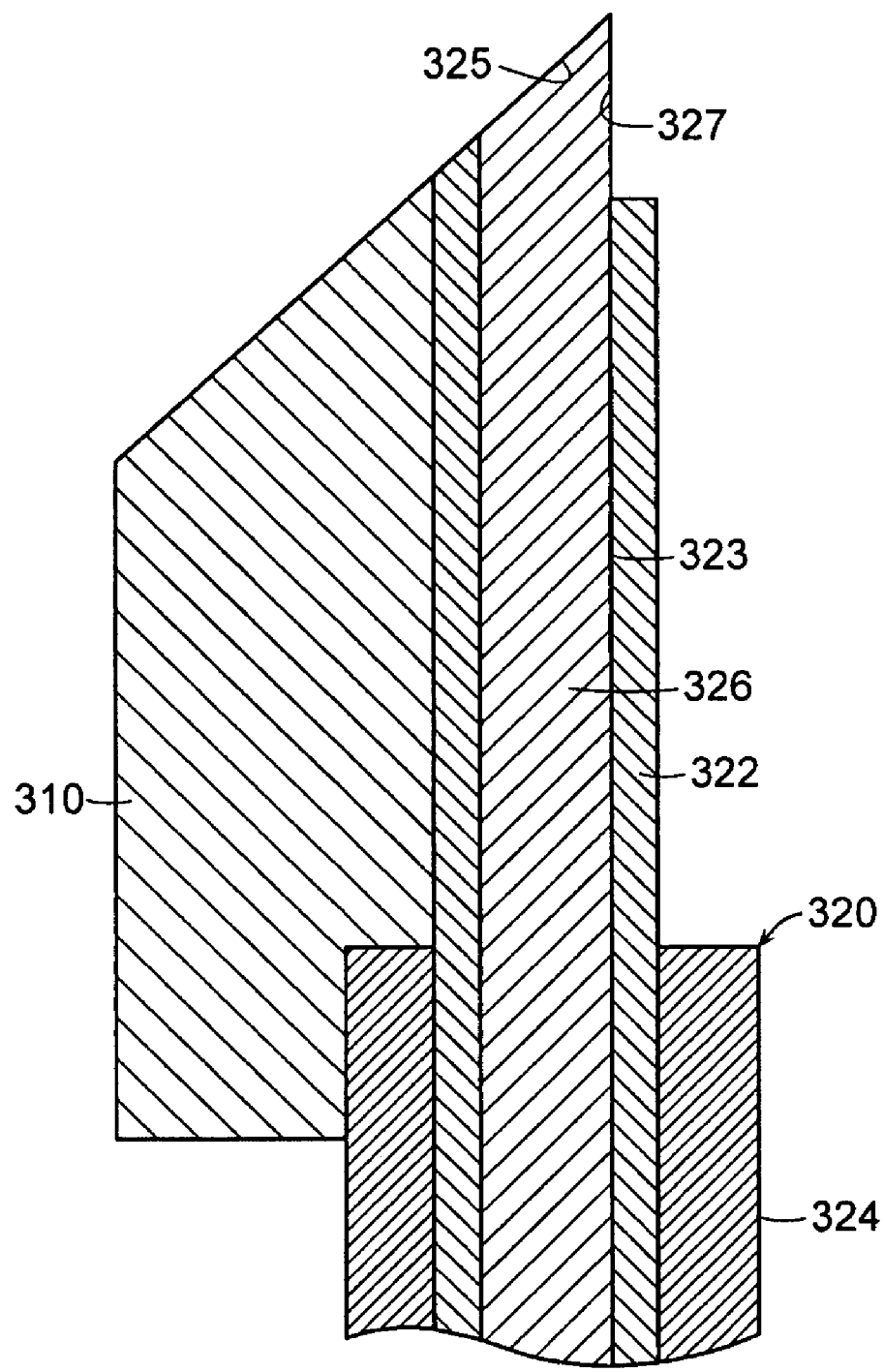
FIG. 4 schematically illustrates a side cross-sectional view of an alternative configuration of a fiber optic termination in accordance with the present invention.

The reflecting surface 25 permits the ejection of light through the side of the fiber 20. Accordingly, the side of the fiber 20 in the region proximate the reflecting surface 25 should permit the transmission of light therethrough. In this regard, at least the jacket 24 (if opaque) must be removed from the side of the fiber 20 at the terminal end 23 to permit the light transmission. In addition, as illustrated in FIGS. 2 and 4, it may be desirable to remove the cladding 23,323 in the vicinity of a transmission surface 27, 327 of the fiber core 26, 326 to facilitate the transmission of light through the transmission surface 27,327 of the fiber core 26,326. The transmission surface 27,327 is disposed at a location relative to the reflecting surface 25, 325 to receive light reflected from the reflecting surface 25,325. For example, the transmission surface 27, 327 may be provided generally opposite the reflecting surface 25,325 to facilitate the transmission of light reflected by the reflecting surface 25,325 out of the fiber core 26, 326.

In particular, as shown in FIG. 2, the transmission surface 27 may be a planar surface disposed at the sidewall 23 of the core 26. Further, it may be particularly desirable to provide a flat transmission surface 27 to minimize any focusing effects that the cylindrical sidewall 23 would have on light transmitted through the cylindrical sidewall 23. The transmission surface 27 may be provided at a transmission face angle, β, relative to the longitudinal axis 21 of the fiber 20. The transmission face angle, β, may be selected so that light reflected from the reflecting surface 25 is normally incident upon the transmission surface 27. For example, if the inclination angle is selected to be 46°, the transmission face angle may be 1°. In addition, the transmission face angle and the inclination angle may be chosen in combination so that light exits the fiber 23 through the transmission surface 27 at an angle that is substantially perpendicular to the longitudinal axis 21 of the fiber 20. For example, the inclination angle may be 45° and the transmission face angle may be 0°. In the case where the transmission face angle is 0°, providing a flat transmission surface 27 on the fiber core 26 may require notching of the fiber core 26.

In a further aspect of the present invention, a method is provided for fabricating a fiber optic termination, such as the fiber optic termination 100 of FIG. 1. In one particularly convenient method for creating the fiber optic termination 100, the present invention utilizes polishing to provide the reflecting surface 25 and the transmission surface 27 on the fiber core 26.

The method includes the step of providing a fiber holding member 10 having fiber grooves 16 and at least one registration feature 12. An optional pocket 18 may also be provided in the fiber holding member 10. The method may also include a fiber preparation step, whereby the fibers 20 are prepared for insertion into the fiber holding member 10. The fiber preparation may include the step of removing the jacket 24 from a desired length of the fiber 20 at the terminal end 23 of the fiber 20 to provide un-jacketed small-width fiber segments and adjoining relatively larger-width, jacketed fiber segments. In accordance with the method, the prepared fibers 20 are placed in the fiber holding member 10. The un-jacketed small-width segments of the fibers 20 are placed in the fiber grooves 16, and the adjoining jacketed relatively larger-width segments of the fibers 20 are placed in the pockets 18, if pockets 18 are provided. The fibers 20 may be secured to the fiber holding member 20 using a suitable adhesive, such as epoxy. The adhesive may encapsulate and surround the fibers 20 to more securely attach the fibers 20 to fiber holding member 10. Alternatively, the fibers 20 may be metalized and the metalized fibers 20 may be retained in the grooves 16 with a suitable solder, such as a nickel-gold solder.

Figure 5:
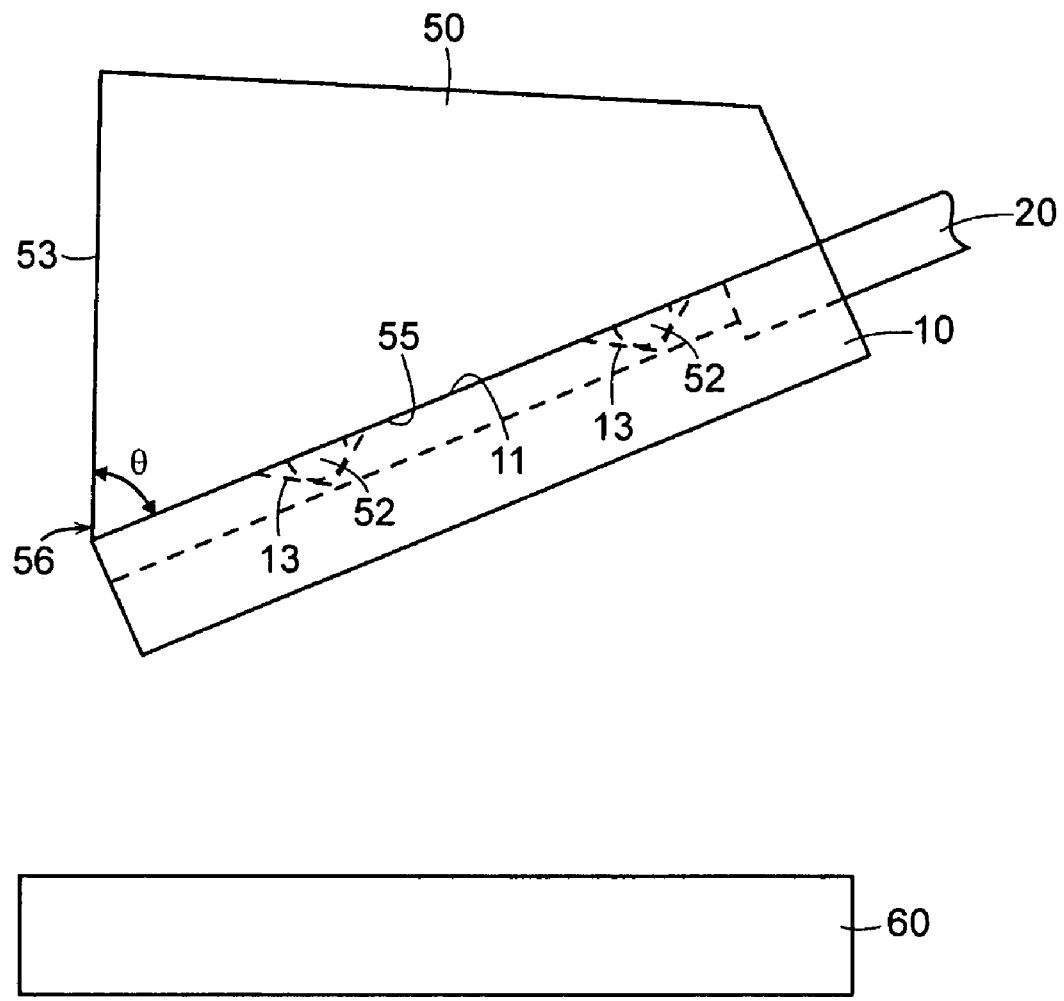
FIG. 5 schematically illustrates a side elevational view of a jig and a fiber holding member registered to the jig for polishing a reflecting surface onto the sidewall of the fiber core.

As a part of the process of creating the reflecting surface 25, the fiber holding member 10 may be affixed to a jig 50 as illustrated in FIG. 5 so that the front face 11 of the fiber holding member 10 is in facing contact with a mating surface 55 of the jig 50. Initially, the fiber holding member 10 may have the shape of a rectangular parallelepiped, though other shapes may be utilized as well. The jig 50 may be provided with registration elements 52, such as the spherical protrusions illustrated in FIG. 5, which may be configured to mate with the registration features 12, e.g., pits 13, of the fiber holding member 10. The jig 50 may include a tip 56 which has a apex angle, θ, between the sidewall 53 in the mating surface 55. The apex angle, θ, may be selected to have a value that is equal to the desired value of the inclination angle, α. The fiber holding member 10 may then be polished with a flat tool 60 having a surface that is oriented orthogonal to the apex sidewall 53. For such a configuration of jig 50 and tool 60, polishing of the fiber holding member 10 provides an inclination angle, α, having a value of θ. The polishing step creates the reflecting surface 25 and an adjoining beveled end face 15 of the fiber holding member 10 which are oriented at the inclination angle, α, relative to the longitudinal axis 21 of the fiber 20.

The polishing is stopped after a selected amount of material has been removed from the fiber 20 and the fiber holding member 10 so that the location of the reflecting surface 25 relative to the registration features 12 has a selected value. One convenient manner for stopping the polishing process is to configure the jig 50, or at least the tip 56 of the jig 50, to be resistant to removal by the polishing process. For example the jig 50 may comprise a material, such as carbide, that is resistant to removal by the polishing process. Thus, when the jig tip 56 comes into contact with the tool 60, no further material will be removed from the fiber holding member 10 or the fiber 20. Once the reflecting surface 25 is formed, the fiber holding member 10 may be removed from the jig 50.

Figure 6A:
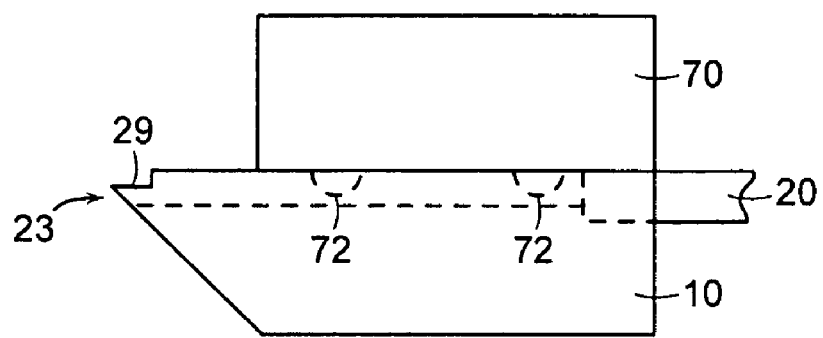
FIG. 6A schematically illustrates a side elevational view of a jig and a fiber holding member affixed thereto for polishing a notched transmission surface onto the sidewall of the fiber core.

Turning now to creating the transmission face 27, FIG. 6A illustrates fixturing the fiber holding member 10 to a jig 70 in an orientation that permits creation of the transmission face 27 in the form of a notch 29 in the fiber core 26. The method includes a step of affixing the fiber holding member 10 to a jig 70 so that the terminal end 23 of the fiber overhangs the jig 70. The overhang provides access to that portion of the fiber 20 at which the transmission face 27 is to be provided. The jig 70 may be provided with registration elements 72, such as the spherical protrusions illustrated in FIG. 5, which may be configured to mate with the registration features 12, e.g., pits 13, of the fiber holding member 10. During a transmission face polishing step, the fiber holding member 10 and fibers 20 are polished using a tool to notch the fiber 20 to provide a transmission face 27 in the form of a notch 29. Alternatively, the method includes creating a transmission face 27 that is oriented at a transmission face angle that is inclined relative to the longitudinal axis 21 of the fiber 20 using a jig configuration as illustrated FIG. 6B.

Figure 6B:
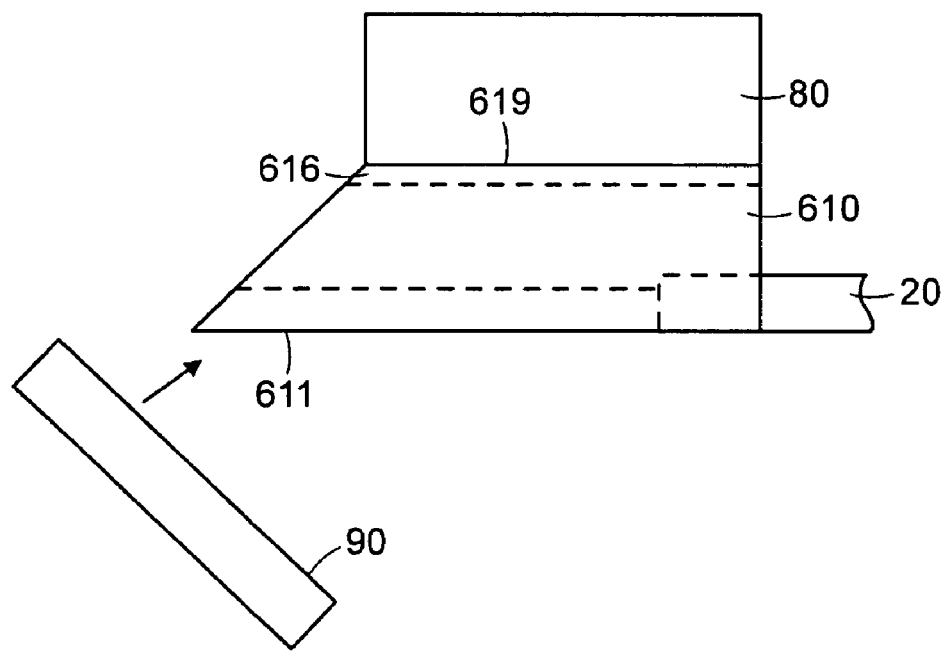
FIG. 6B schematically illustrates a side elevational view of a jig and a fiber holding member affixed thereto for polishing an inclined transmission surface onto the sidewall of the fiber core.

FIG. 6B illustrates fixturing a fiber holding member 610 to a jig 80 in an orientation that permits creation of an inclined transmission face on the fiber 20. The method includes a step of affixing a mounting surface 619 of the fiber holding member 610 to a jig 80 to provide access to a side of the fiber 20 proximate the front face 611 of the fiber holding member 610. The mounting surface 619 may be located on the opposite side of the fiber holding member 610 from the front face 611. The mounting surface 619 of the fiber holding member 610 may include one or more registration features 616 used to align the fiber holding member 610 to the jig 80. For example, the registration features 616 may take the form of grooves, pits, through-holes, or protrusions. The jig 80 may be provided with registration elements, such as spherical protrusions, which are configured to mate with the registration features 616 in the mounting surface 619 of the fiber holding member 610. During the transmission face polishing step, the fiber holding member 610 and fibers 20 are polished using a tool 90 that is oriented at an angle relative to the longitudinal axis of the fiber 20 to provide a transmission face that is oriented at a transmission face angle that is inclined relative to the longitudinal axis of the fiber 20.

These and other advantages of, the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A fiber optic termination for registering an optical fiber to an optical component, comprising:
   a fiber holding member for terminating an end of an optical fiber to provide a fiber optic connector;
   at least one optical fiber having a distal end, a proximal end, and a core, the distal end disposed externally to the fiber holding member and the proximal end retained in the fiber holding member, the proximal end of the fiber having a light reflecting surface disposed at an angle relative to the longitudinal axis of the fiber to deflect light from the fiber core through the side of the fiber, the fiber further comprising a transmission surface positioned to receive light deflected from the light reflecting surface, the transmission surface comprising a planar sidewall section of the fiber core; and
   a registration feature disposed on the fiber holding member for positioning the proximal end of the fiber in registration to an optical component.

2. The fiber optic termination according to claim 1, wherein the transmission surface is oriented to receive at normal incidence light deflected from the reflecting surface.

3. The fiber optic termination according to claim 1, wherein the transmission surface comprises a notched section of the fiber core.

4. The fiber optic termination according to claim 1, wherein the reflecting surface comprises a planar sidewalls section of the fiber core.

5. The fiber optic termination according to claim 1, wherein the registration feature comprises a detent disposed in a surface of the holding member.

6. The fiber optic termination according to claim 1, wherein the fiber holding member comprises single crystal silicon.

7. The fiber optic termination according to claim 1, comprising a reflective coating disposed on the reflecting surface.

8. The fiber optic termination according to claim 1, comprising a protective coating disposed on the reflecting surface for preventing frustration of total internal reflection at the reflecting surface.

9. The fiber optic termination according to claim 1, wherein the optical fiber comprises a large-width section of a predetermined width and an adjoining small-width section of relatively smaller width, and wherein the waveguide holding member comprises a groove for receiving the small-width section and comprises a pocket for receiving the large-width section.

10. The fiber optic termination according to claim 1, wherein the reflecting surface is oriented to provide total internal reflection of light incident on the reflecting surface from along the direction of the longitudinal axis of the fiber.

11. A method for fabricating a fiber optic termination, comprising the steps of:

providing a fiber holding member having a registration feature disposed at a front face of the fiber holding member and having a recessed area at the front face for receiving an optical fiber;

securing the terminal end of an optical fiber in the recessed area of the fiber holding member;

attaching the fiber holding member to a jig by registering the registration feature of the fiber holding member to a registration element of the jig and securing the front face of the fiber holding member to a mating surface of the jig; and polishing the previously secured terminal end of the fiber at a selected angle relative to the longitudinal axis of the fiber to provide a light reflecting surface oriented to deflect light from the fiber core out through the side of the fiber.

12. The method according to claim 11, comprising the step of polishing the secured terminal end of the fiber at a selected angle relative to the longitudinal axis of the fiber to provide a transmission surface at the proximal end of the fiber that is oriented to receive light deflected from the light reflecting surface.

13. The method according to claim 11, wherein the step of providing a fiber holding member having a registration feature comprises the step of providing a registration feature comprising a detent.

14. The method according to claim 11, wherein the polishing step comprises the step of polishing the terminal end of the fiber at a an angle that provides for total internal reflection of light at the reflecting surface.

15. The method according to claim 12, wherein the transmission surface comprises a planar sidewall section.

* * * * *